United States Patent [19]

Schwartzbach

[11] Patent Number: 4,755,366
[45] Date of Patent: Jul. 5, 1988

[54] PROCESS FOR CLEANING HOT WASTE GAS OCCURING IN VARYING AMOUNTS

[75] Inventor: Christian Schwartzbach, Måløv, Denmark

[73] Assignee: A/S Niro Atomizer, Søborg, Denmark

[21] Appl. No.: 821,589

[22] Filed: Jan. 23, 1986

[30] Foreign Application Priority Data

Feb. 4, 1985 [DK] Denmark .......................... 489/85

[51] Int. Cl.$^4$ .................. C01B 21/00; C01B 7/00; C01B 17/50
[52] U.S. Cl. .................................. 423/235; 423/240; 423/242
[58] Field of Search .......... 423/242 R, 242 A, 244 A, 423/244 R, 240 R, 240 S, 235, 235 D

[56] References Cited

U.S. PATENT DOCUMENTS

| | | | |
|---|---|---|---|
| 4,246,242 | 1/1981 | Butler et al. | 423/210 |
| 4,452,765 | 6/1984 | Peterson et al. | 423/242 |
| 4,481,171 | 11/1984 | Baran et al. | 423/242 |
| 4,560,543 | 12/1985 | Caspersen et al. | 423/242 |
| 4,585,633 | 4/1986 | Van Camp et al. | 423/242 |

FOREIGN PATENT DOCUMENTS

3142775  5/1983  Fed. Rep. of Germany.

*Primary Examiner*—Gregory A. Heller
*Attorney, Agent, or Firm*—Beveridge, DeGrandi & Weilacher

[57] ABSTRACT

The ability of a waste gas cleaning spray drying absorber to tolerate substantial variations in the amount of waste gas to be cleaned is enhanced by a system which provides for introduction of any amount of waste gas that would overload the gas disperser(s) of the spray drying absorber, into said absorber via auxiliary apertures in the walls thereof thereby bypassing the gas disperser(s).

A plant for cleaning fluctuating amounts of waste gas comprises a control system based on measurement of gas flow to the gas disperser(s).

8 Claims, 2 Drawing Sheets

PROCESS FOR CLEANING HOT WASTE GAS OCCURING IN VARYING AMOUNTS

BACKGROUND OF THE INVENTION

The present invention relates to a process and a plant for cleaning hot waste gas produced in varying amounts.

It is conventional to clean hot waste gases, such as flue gases from power stations, incineration plants and heating stations to remove harmful components such as sulphur oxides, hydrogen chloride and nitrogen oxides to avoid environmental damages when the waste gas is released into the atmosphere.

A method which has proved most acceptable for removing said harmful components from hot waste gases is the so-called spray drying absorption process in which an aqueous solution or suspension of an absorbent for the harmful components is atomized into a stream of the hot waste gas to be cleaned. Thereby a substantial part of the harmful components is absorbed and the atomized solution or suspension of absorbent is dried forming a powder comprising the harmful components removed from the waste gas.

Said type of processes has hitherto mainly been applied for absorbing acidic components such as sulphur oxides and hydrogen chloride by means of basic absorbents such as hydroxide and carbonates of alkali metals or alkaline earth metals. A typical example of a process of said type is disclosed in U.S. Pat. No. 4,279,873.

In one of the preferred embodiments described in said U.S. specification the process is performed in a spray drying chamber having a cylindrical upper portion and a conical bottom portion. An atomizer for atomizing the aqueous absorbent is provided for in the ceiling of said chamber and hot waste gas is introduced into the chamber through a gas disperser surrounding the atomizer. Another stream of waste gas to be cleaned is introduced through a gas disperser arranged centrally in the chamber below the atomizer and blowing waste gas upwards against droplets of aqueous absorbent leaving the atomizer.

Gas dispersers suitable for spray drying absorption processes of the type described require a supply of waste gas within certain limits to be able to deliver a waste gas stream of suitable velocity to contact the atomized absorbent in a manner which ensures efficient operation. This is i.a. due to the fact that specific requirements exist as to velocity and direction of the streams of waste gas meeting the atomized droplets of absorbent in order to provide efficient contact of the gas with the droplets and at the same time create a gas flow pattern that prevents wet particles from getting into contact with and form deposits on the chamber wall. It is also required that the pressure drop over the gas disperser, and consequently the power consumption, is as low as possible.

Basically the principles used in spray drying absorption processes of the type described (e.g. desulfurization processes) allow substantial variations in the amounts of waste gas to be treated since the amount and concentration of aqueous absorbent may be adjusted within wide limits, especially when rotary atomizers are used. That means that the limits as to acceptable variations in the amount of waste gas to be treated will often be set by the characteristics of the gas disperser(s).

In large plants problems due to variations in the amount of waste gas produced may be solved by using a plurality of spray drying absorbers, which are put into operation or disconnected as required. However, in plants having only a few or a single spray drying absorber that possibility is not suitable or possible.

It has also been suggested to cope with said variations by using a gas disperser having adjustable cross section of the flow path. However, the means enabling such an adjustment are quite complicated and expensive and may be too delicate to ensure troublefree operation in connection with corrosive and ash containing waste gases such as flue gas. Gas dispersers with adjustable gas passage are described in e.g. published Danish patent application No. 5029/80.

In spray absorption processes for flue gas cleaning it has been suggested to promote the reaction between the atomized absorbent and noxious components of the flue gas by maintaining a high relative humidity in the central area of the drying chamber. This is made possible by injecting flue gas through apertures in the walls of the drying chamber to sweep said walls and thereby avoiding deposits of moist spent absorbent. Such a system is described in published Danish patent application No. 146,214.

It should be emphasised that the above mentioned process using an introduction of gas through apertures in the walls of the drying-absorption chamber to sweep said walls requires a fairly constant amount of gas to be introduced as wall sweep and if said amount drops under a certain volume moist spent absorbent will deposit on the walls and finally interrupt the operation.

Consequently said known process is not apt for treating very fluctuating amounts of waste gas.

SUMMARY OF THE INVENTION

We have now found that introduction of that portion of the waste gas which exceeds the amount corresponding to the efficient capacity of the gas-disperser(s), in a tangential and/or downward direction through apertures in the walls of the spray drying absorption chamber, provides suitable means for increasing the versatility as to capacity of a given spray dryer absorber.

Consequently it is an object of the invention to provide a process for cleaning waste gas occurring in varying amounts by blowing a stream of said waste gas through at least one gas disperser into a spray drying absorption chamber, atomizing an aqueous absorbent into said stream of waste gas in the drying absorption chamber thereby absorbing harmful components of the waste gas and producing a dry powdery spent absorbent, and by-passing said gas disperser by a waste gas stream and introducing said by-passed stream into the drying absorption chamber through apertures in the walls thereof, comprising adjusting the amount of the waste gas forming said by-passed stream dependent on the load on the gas disperser, thereby establishing said by-passed stream when said load raises to a value higher than one permitting efficient function of the waste gas disperser, and interupting said bypassed stream when said load falls below the one by which the function of the waste gas disperser is optimal.

The load on the gas disperser, in dependency of which adjustment takes place of the amount of waste gas by-passed the gas disperser, may either be measured or predicted. Measurement of the load may be performed e.g. by measuring the pressure drop over the gas disperser or by measuring the gas volume supplied to the gas disperser. The gas volume supplied to the gas dispersers may be measured e.g. by means of stream velocity determinations using pitot tubes or determination of pressure drop over a path having restricted cross section. By such measurements, performed continuously or intermittently, adjustment of the amount of by-passed waste gas may take place to ensure efficient operation even when highly fluctuating amounts of waste gas have to be cleaned.

Knowledge of the amount of waste gas may also be obtained from the boiler load control system, from which signals may be transmitted to control the distribution to the gas disperser(s) and the by-pass line.

In some power stations or heating stations it may be possible to predict the amount of waste gas produced on the basis of a known schedule for power or heat production. In that case the adjustment of the amount of waste gas to be by-passed the gas disperser may be performed by automatic or manual date or hour dependent regulation of a valve means controlling the by-passed stream.

From the above cited published Danish patent application No. 146,214 it is known that a certain amount of waste gas may be introduced into the absorption chamber though apertures in the walls thereof without an unacceptable decrease in efficiency of the total desulphurization process, provided that an especially high humidity is maintained in major parts of the absorption chamber. It is explained that the improvement in reactivity due to the increased humidity surprisingly more than compensates the deterioration of conditions of contact and reaction, which results for the gas introduced through said apertures.

However, it has surprisingly turned out that the deterioration of the conditions as to contact and reaction for the gas introduced through the chamber walls, in comparison with the conditions which meet the gas introduced through the gas disperser(s) is less pronounced than what would have been expected. It has been shown that even if no increase of humidity is provided in the central areas of the drying chamber, only a very moderate reduction of total gas treating efficiency is experienced. Especially when particle separation downstream of the absorption chamber takes place by means of a baghouse an efficient gas cleaning may be obtained due to absorption by reactive dried particles of absorbent on the filter surfaces of the baghouse.

To avoid disturbance of the flow pattern in the central areas of the absorption chamber the introduction of waste gas through apertures in the chamber wall takes place in directions having only a small radial component, preferably along the chamber wall in tangential and/or downward directions.

When the concept of the present invention is utilized in connection with processes of the above described type in which an absorber is used having a roof gas disperser encircling an atomizer for aqueous absorbent as well as an upward directed central gas disperser placed below the atomizer in the drying absorption chamber the process comprises the steps of (a) dividing the waste gas into a first stream which corresponds to the optimum capacity of the central gas disperser and a second stream which comprises any remaining part of the waste gas to be cleaned at each moment, (b) feeding said first stream to said central gas disperser, (c) dividing any second stream into a third stream the maximum amount of which corresponds to the maximum capacity of the roof gas disperser, and a fourth stream comprising any remaining part of said second stream, (d) feeding any third stream to said roof gas disperser, and (e) feeding any fourth stream to the spray drying absorption chamber through apertures in the walls thereof.

In that embodiment the central gas disperser will be the sole means for introducing waste gas into the absorption chamber, when only very small amounts of waste gas have to be treated. When the amount of waste gas increases a part thereof is also introduced through the roof gas disperser. Only when the amount of waste gas to be treated surpasses the one which may be efficiently introduced through the two gas dispersers, introduction through the wall apertures is performed.

The division of the waste gas into said first and said second stream is suitably performed in response to a measurement of the velocity of stream let to the central gas disperser and the division of said second stream is suitably performed in response to a measurement of the pressure drop over the ceiling gas disperser.

It is also an object of the invention to provide a plant suitable for carrying out the above described processes.

Consequently the invention also comprises a plant for cleaning varying amounts of hot waste gas and having a spray drying absorber with a spray drying absorption chamber, an atomizer for atomizing an aqueous absorbent into said chamber, a roof gas disperser for injecting waste gas downwards around the atomizer, apertures in the walls of the chamber for blowing waste gas into the chamber along the inner walls thereof, and a first duct for supplying waste gas to the roof gas disperser and a second duct for connecting said first duct with said apertures, which plant comprises (a) a detecting means for measuring gas flow through the roof gas disperser (b) a valve means in said second duct, and (c) a control means connected to said detecting means and to the valve means and controlling said valve means in response to signals received from the detecting means, thereby closing the valve means when said gas flow is below a pre-set value.

The invention also provides for a plant of the above defined type which further has a central gas disperser in the absorption chamber. In supplement to the above features (a)–(c) characteristic for the above defined plant, this embodiment comprises the following:

(d) a further waste gas disperser mounted centrally in the spray drying absorption chamber below the atomizer for injecting waste gas upwards against the atomized absorbent, (e) a third duct connecting said further gas disperser to said first duct at a location upstream of the site where said second duct meets the first duct, (f) further detecting means for measuring gas flow rate in said third duct, (g) a further valve means inserted into the first duct at a location between the sites where the first duct is connected to the second duct and to the third duct, resp., and (h) a further control means connected to said further detecting means and to the further valve means and controlling said further valve means in response to signals received from said further detecting means, thereby closing the valve means when the gas flow in the third duct is below a pre-set value.

BRIEF DESCRIPTION OF THE DRAWING

In the following the invention is described in more detail with reference to the drawing wherein FIG. 1 very schematic depicts a plant according to the invention comprising a spray drying absorber having a roof gas disperser, and FIG. 2 very schematic depicts a plant according to the invention comprising a spray drying absorber which besides a roof gas disperser has a central gas disperser.

DESCRIPTION OF THE PREFERRED EMBODIMENTS OF THE PLANT

Figure 1:
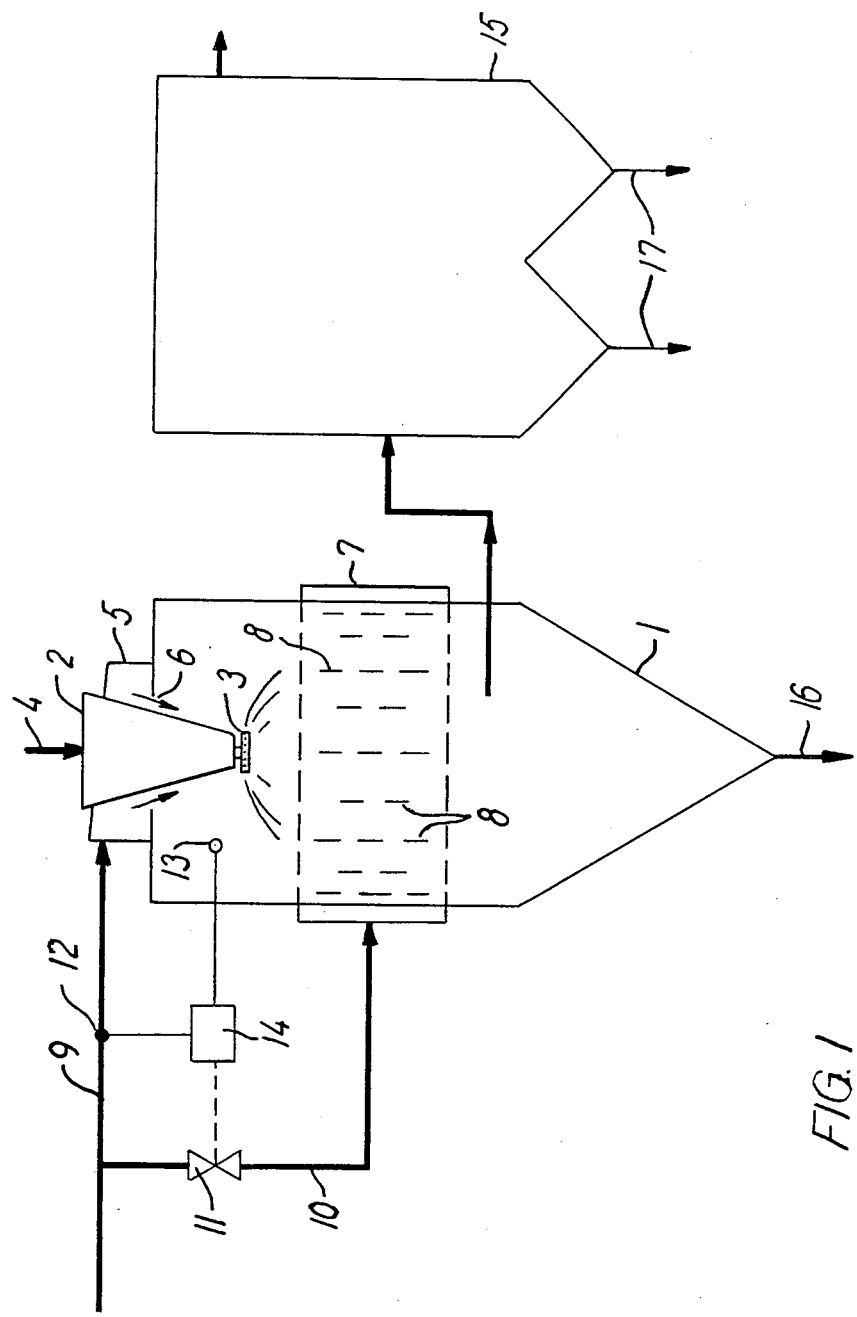

Referring to the drawing 1 indicates a spray drying absorption chamber having a cylindric upper portion and a conical bottom portion.

Said chamber is provided with a rotary atomizer 2 having an atomizer wheel 3.

The atomizer is fed with an aqueous suspension of absorbent supplied through conduit 4. Said aqueous suspension is atomized into droplets which are ejected from the atomizer wheel.

The atomizer 2 is surrounded by a roof gas disperser 5 from which an annular passage 6 leads to the interior of the chamber 1.

A part of the cylindrical portion of the spray drying absorption chamber is covered by a jacket 7, and the portion of the chamber walls covered by said jacket is provided with a plurality of apertures 8 (preferably slots).

The apertures 8 are directed to ensure that gas blown into the chamber from the jacket reaches the chamber in directions having only a small radial component, preferably in tangential directions. Thereby introduction of gas through the apertures will only involve a minor disturbance of the flow pattern created by the roof gas disperser. The practical construction of such apertures or slots is shown in e.g. U.S. Pat. No. 1,634,640 and in published Danish patent application No. 146,214.

Hot waste gas to be cleaned, e.g. flue gas to be desulphurized, is supplied to the roof gas disperser 5 through a duct 9. A duct 10 branched from the duct 9 and having a valve 11 is connected to the jacket 7.

In the embodiment depicted in FIG. 1 two pressure sensors 12 and 13 are arranged in the duct 9 and inside the chamber 1, resp. Both sensors 12, 13 supply signals to a controller 14 which adjusts the valve 11 in response to the difference between the signals received from the sensors 12 and 13.

Alternatively the controller 14 may receive signals from other means (not shown) for evaluating the amount of gas supplied through the duct 9, e.g. means measuring the pressure drop over a venturi or other path of reduced cross section, or a pitot tube inserted in duct 9. The controller 14 may also receive signals from a clock to enable automatic date or hour dependent adjustment of the valve 11. However, for the sake of simplicity the embodiment of FIG. 1 is here explained presuming that the pressure drop over the gas disperser 5 is selected as flow controlling species.

As long as the difference between said two signals is below a pre-set value fixed on basis of the characteristics of the roof gas disperser 5, especially the area of the annular passage 6, the valve 11 remains closed and the total amount of waste gas is led to the roof gas disperser 5 and through the annular passage 6 where it is blown downwards against the droplets released from the atomizer wheel 3. The downward velocity of the gas when meeting the atomized droplets must be within certain limits. Gas disperser loads corresponding to these limits may be fixed by the expert, if possible by observation of the shape of the cloud of atomized droplets or by measuring the pressure drop over the gas disperser. As an indication of efficient contact between the atomized droplets and the gas the atomizer cloud should have an umbrella-like shape. If the downward velocity of the gas is too high, not only is the shape of the atomizer cloud disturbed, but also the pressure drop over the gas disperser becomes uneconomically high.

The amounts of waste gas (as expressed as flow rates in duct 9 or pressure drop over gas disperser 5) corresponding to such undesirable high velocities may easily be fixed by experiment with each individual type of spray drying absorber apparatus using the actual operating conditions.

When the amount of waste gas to be treated increases, the pressure drop over the roof air disperser 5 increases, which is monitored as the difference between the signals from the sensors 12 and 13, resp. When said difference exceeds the above defined value a signal from the controller 14 opens the valve 11 and a part of the waste gas is guided through the duct 10 to the jacket 7 and from there to the chamber 1 via the apertures 8. By this measure the amount of gas to be blown through the gas disperser 5 is reduced and consequently the pressure drop over said disperser is reduced and the same obviously applies to the velocity of the gas meeting the atomized droplets and efficient contact and reaction between gas and droplets is ensured.

The portion of the waste gas introduced through the apertures 8 mixes with the gas introduced through the roof gas disperser and with the partly dried droplets of absorbent suspension or solution. The resulting gas mixture and entrained particles of partly reacted absorbent is led to a particle separator 15, preferably a baghouse where further absorption of undesired components takes place. From the particle collector the gas may be released to the atmosphere via a stack (not shown).

In the depicted embodiment a portion of the spent absorbent is recovered as a dry powder from the bottom of the chamber 1 as illustrated by conduit 16 whereas the remaining part of the spent absorbent is recovered from the particle separator as illustrated by 17.

It has surprisingly turned out that the amount of waste gas introduced through duct 10 may be increased to nearly half of the total amount of waste gas treated without undue decrease of absorption efficiency of the plant. When the plant is used e.g. for desulphurisation of flue gas by means of slaked lime it is thus possible to introduce nearly half of the waste gas through duct 10 and still maintain a removal of more than 80% of the sulphur oxides in the waste gas.

Obviously the plant also comprises conventional control means (not shown) for adjusting the amount of absorbent and water atomized dependent on the need therefore.

The plant illustrated in FIG. 2 comprises the same details as the plant described in connection with FIG. 1. In addition thereto the spray drying absorber shown in FIG. 2 has a central gas disperser 18 terminating below the atomizer wheel and apt for blowing gas upwards against the droplets ejected from the wheel.

A duct 19 connects said gas disperser with the duct 9 through which the waste gas is supplied.

A flow rate meter (pitot tube, venturi or the like) 20 is inserted in the duct 19, which flow rate meter communicates signals to a controller 21.

The controller 21 is apt for controlling a valve 22 inserted in the duct 9 at a location upstream of the branching of duct 10 and downstream of the location where the duct 19 is branched from the duct 9.

Valve 22 will thus be adjusted in response to the amount of gas supplied to the central gas disperser 18.

Figure 2:
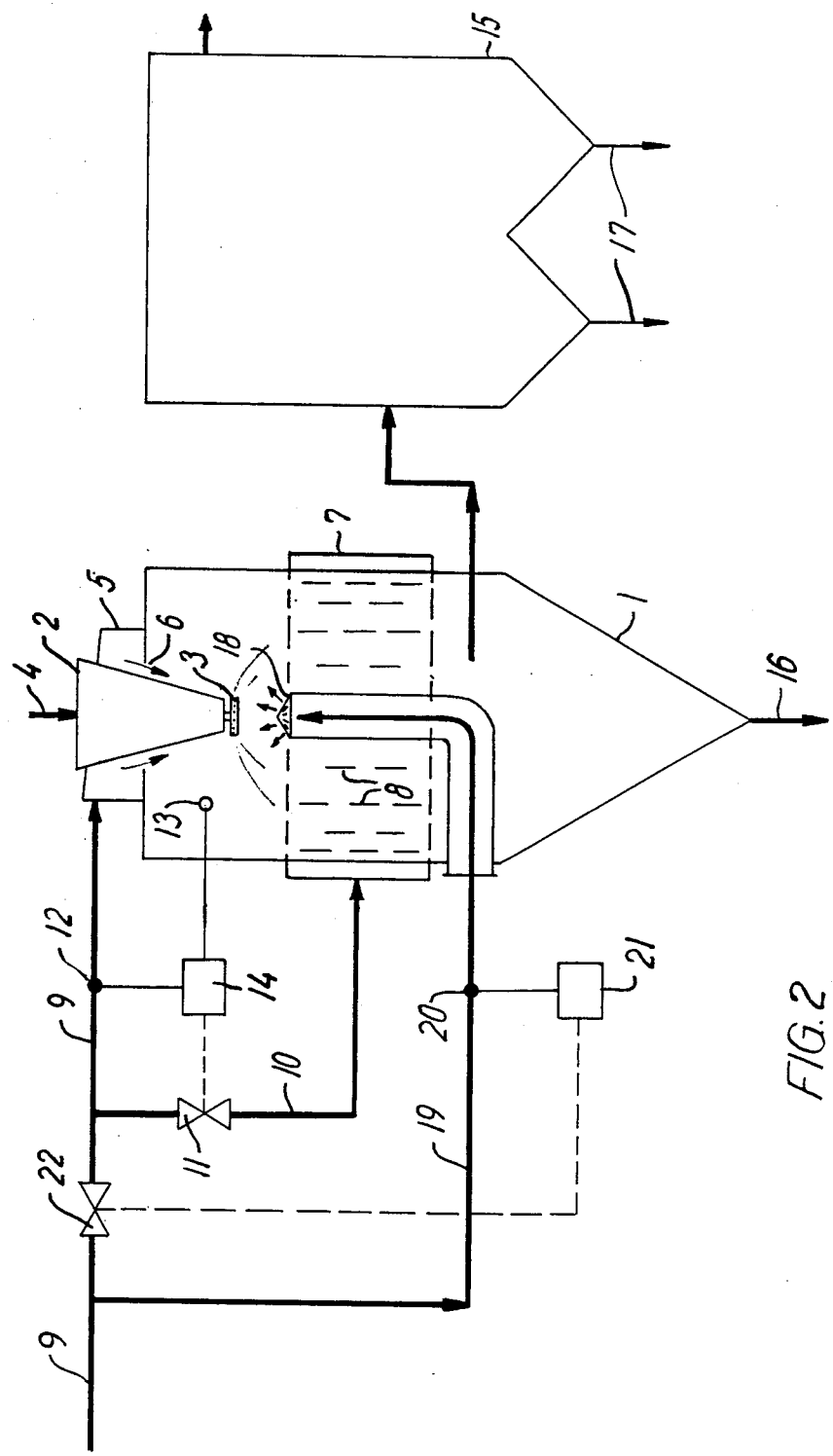

The operation of the plant depicted in FIG. 2 is analogous to the operation of the plant depicted in FIG. 1 and it is to be understood that the controllers 14 and 21 may be set to ensure that the operation is as follows:

(i) Relatively small amount of waste gas: all the waste gas is introduced through gas disperser 18.

(ii) Moderate amount of waste gas: waste gas is introduced through the central gas disperser 18 and the roof gas disperser 5.

(iii) Large amounts of waste gas: Waste gas is introduced through the central gas disperser 18, through the roof gas disperser 5 and through the apertures 8 via the jacket 7.

Obviously the embodiment illustrated in FIG. 2 will be able to treat very fluctuating amounts of waste gas while keeping the load on the gas dispersers on values which permit efficient operation of said gas dispersers.

The invention is further illustrated by means of the following embodiment example.

EXAMPLE

Flue gas was desulfurized in a plant as illustrated in FIG. 2. The spray drying absorption chamber had a diameter of 8.5 m and a cylindrical height of 8.25 m.

The flue gas came from a power/heating plant having three boilers, two coal fired and one oil fired.

The flue gas rate varied from 11,000 to 120,000 Nm$^3$ per hour. The control system was designed to divide the gas streams as follows:

| Gas rate Nm$^3$/h | Gas introduced in chamber through: |
|---|---|
| 11,000–22,000 | Central gas disperser (18) only |
| 22,000–96,000 | Central gas disperser (18) + Roof gas disperser (5) |
| 96,000–120,000 | Central gas disperser (18) + Roof gas disperser (5) + Wall apertures (8) |

The absorbent was an aqueous slurry of slaked lime and the flue gas temperature varied between 120° and 150° C. The temperature of the cleaned gas varied between 57° and 72° C.

With all gas rates within the specified limits (11,000 to 120,000 Nm$^3$/h) it was possible to maintain SO$_2$ removal from the flue gas at a minimum of 85%. No prior art spray drying absorption single chamber constructions permit such wide variations of gas rate, when the desulfurization efficiency has to be maintained at said level.

I claim:

1. A process for cleaning a varying amount of hot waste gas comprising
   providing a source of fluctuating amounts of waste gas containing at least one of the group consisting of sulfur oxides, hydrogen chloride and nitrogen oxides as harmful components,
   blowing a stream of said waste gas through at least one gas disperser into a spray drying absorption chamber;
   atomizing an aqueous absorbent into said stream of waste gas in the drying absorption chamber thereby absorbing harmful components of the waste gas and producing a dry, powdery spent absorbent;
   when the amount of hot waste gas increases to an value in excess of the value that permits efficient functioning of the gas disperser then providing a by-pass stream of waste gas in an amount essentially equal to the excess amount of waste gas that by-passes said gas disperser;
   introducing said by-pass stream into the drying absorption chamber through apertures in the walls thereof;
   and when the amount of hot waste gas falls to a value below the amount at which the gas disperser operates efficiently then interrupting and closing off the by-pass stream thereby controlling the amount of waste gas forming said by-pass stream depending on the load on the gas disperser such that the amount of waste gas in said by-pass stream is increased when said load rises to a value higher than one permitting efficient functioning of the waste gas disperser, and the amount of waste gas in the by-pass stream is interrupted when said load falls below the one by which the functioning of the waste gas disperse is optimal.

2. The process of claim 1, comprising
   (a) measuring the amount of waste gas introduced through the gas disperser, and
   (b) adjusting the amount of gas in the by-pass stream in response to said measurement.

3. The process of claim 2, wherein the measurement of the amount of waste gas in step (a) is performed by measuring pressure drop over the gas disperser.

4. The process of claim 2, wherein the measurement of the amount of waste gas in step (a) is performed by measuring the gas velocity of the gas stream fed to the gas disperser.

5. The process of claim 1, wherein the stream introduced into the drying absorption chamber through apertures in the walls thereof is injected in directions having only a small radial component.

6. A process for cleaning a varying amount of hot waste gas comprising
   providing a source of fluctuating amounts of waste gas containing at least one of the group consisting of sulfur oxides, hydrogen chloride and nitrogen oxides as harmful components by blowing a stream of said waste gas through at least one central gas disperser into a spray drying absorption chamber having a roof gas disperser encircling an atomizer for aqueous absorbent and an upwardly directed, central gas disperser placed below the atomizer in the drying absorption chamber,
   (a) when the amount of waste gas increases to a value in excess of the value that permits efficient functioning of the gas disperser, dividing the waste gas into a first stream which corresponds to the optimum capacity of the central gas disperser and a second stream which comprises any remaining part of the waste gas to be cleaned at each moment;
   (b) feeding said first stream to said central gas disperser;
   (c) dividing said second stream into a third stream the maximum amount of which corresponds to the maximum capacity of the roof gas disperser and a fourth stream comprising any remaining part of said second stream;

(d) feeding any third stream to said roof gas disperser; and (e) feeding any fourth stream to the spray drying absorption chamber through apertures in the walls thereof.

7. The process of claim 6, wherein the division of waste gas into a first and a second stream is performed in response to a measurement of the velocity of the stream let to the central gas disperser and the division of any second stream is performed in response to a measurement of the pressure drop over the roof gas disperser.

8. The process of claim 6, wherein the fourth stream introduced into the drying absorption chamber through apertures in the walls thereof is injected in directions having only a small radial component.

* * * * *